Feb. 9, 1971           H. R. CARLON           3,562,006

INFRARED SOURCE

Original Filed May 24, 1967           4 Sheets-Sheet 4

INVENTOR,
Hugh R. Carlon
Harry M. Saragovitz
Edward J. Kelly
Herbert Berl, ATTORNEYS
BY Jacob Ziegler,
AGENT.

United States Patent Office 3,562,006
Patented Feb. 9, 1971

3,562,006
INFRARED SOURCE
Hugh R. Carlon, Edgewood, Md., assignor to the United States of America as represented by the Secretary of the Army
Original application May 24, 1967, Ser. No. 642,662, now Patent No. 3,450,864. Divided and this application Dec. 27, 1968, Ser. No. 840,542
Int. Cl. H05 3/10
U.S. Cl. 117—213                                4 Claims

ABSTRACT OF THE DISCLOSURE

Structure treated with a coating and pitted with an abrasive thereby emitting infrared spectrum meeting or exceeding Globar emissivities in air. A metal envelope encasing a resistance wire wound upon a core and an insulating material therebetween, axial lead of the ends of the resistance wire connected to an external source of electrical energy, and the textured and carbon coated external surface of the said metal envelope.

---

This is a division of my application Ser. No. 642,662, filed May 24, 1967, now Pat. No. 3,450,864.

This invention relates to a new highly emissive source of infrared radiation. More specifically, a standard line of cartridge-heaters can be modified by sandblasting and carbonoid lacquer coating to yield highly emissive infrared radiation sources which will operate with desirable voltage and current characteristics over a wide range of power ratings.

Another object is the provision of an infrared source permitting AC or DC operation at Globar range of temperatures, over a wide range of power ratings, using conventionally available voltages at moderate currents.

A further object is to provide an infrared source which is rugged, inexpensive, environmentally stable, and long-lived. The source is capable of continuous operation in excess of one year at color temperatures of about 850° C., without periodic maintenance or substantial change in spectral quality.

In accordance with the present invention, a cartridge-heater is sandblasted and thickly coated with carbon in a volatile vehicle. The coated heater is subjected to operating temperature, thereby an ash residue is formed on the surface.

At the present time most infrared spectrometers use an infrared radiation source that is either a Globar (sintered silicon carbide) or a Nernst Glower (zirconium oxide mixed with yttrium oxides).

In operating an infrared Nornst Glower source, for example, it is normal to use AC operation where possible. Where DC is more convenient, such as in the field, it is necessary to reverse the current at intervals of from a few seconds to several minutes to prevent deterioration of the Glower. The miniature (0.75 mm. x 0.75 mm.) Nernst Glower (Glower) can be built to operate with as little as 4 watts of power, and has convenient, attached lead, although separate support of the rod is still required. The Glower, however, operates over a restricted temperature range (although higher than a standard heater) and requires preheating to begin operation. The Glower unit is fragile, operable only on AC if long life is required, has a low thermal mass, and is poor in emissivity in the near and intermediate infrared.

The Glower is brittle and subject to lead open-circuiting under certain operating conditions, and the leads are simply wrapped on the body of the unit and secured with a brittle cement which is easily broken or pulled lose.

The Globar is a rod of bonded silicon carbide. Its usual configuration is about 5 cm. long and 5 mm. in diameter. It is heated electrically from a power supply of about 180 watts at 50 volts, and has a lifetime of about 250 hours when operating at about 1500° K., in air. However, it has been shown that this source can be operated at temperatures up to 2200° K. Silver electrodes are employed, and the ends of the Globar are silver coated. In order to prevent overheating of the end connections, a water cooled jacket is utilized as an external cooling means.

The method of treating the surface of the cartridge-heater is by sandblasting and coating the surface with a lacquer containing carbon in the vehicle.

Sandblasting is one of the simplest and most effective methods of producing a scarred or textured surface. The marking of surfaces is by the discharge of fine abrasives or other grit material through a nozzle at high velocity by means of compressed air. The apparatus and method used in this invention is similar to that utilized for marking and engraving either glass or metal, for example, hand bellows or power driven compressor utilizing a flexible hose carrying the blast nozzle which is directed upon the desired surface. The fine abrasives can be either natural material such as garnet, dolomite, flint quartz and silica or manufactured materials such as aluminum oxide, silicon and carbide; the grit can be angular metallic particles such as crushed hardnened steel. Selection of a suitable abrasive in reference to type, size and hardness for a specific application is influenced by the type of surface to be textured. The abrasive should at all times be moving over the surface in order to have the markings uniform over the surface and thus avoiding the undesired excessive marking at localized points. The silica grit size can be in the range from 20 to 200 mesh and above, and the nozzle can vary from ¼ to ½ inch in diameter, and the pressure can be in the range from 30 to 90 pounds per square inch.

A lacquer is utilized for coating the surface after sand-blasting. The lacquer comprises carbon in fine subdivision in the proportion of about 20–25% in a volatile solvent in the proportion of 80–75%. Various types of carbon may be employed such as channel black, furnace black, thermal black, acetylene black, and lamp black. The volatile solvent can be aromatics such as toluene, xylene, aliphatic acetates such as ethyl acetate, butyl acetate, amyl acetate, aliphatic alcohols such as ethyl alcohol, butyl alcohol, acetone, and methyl-ethyl-ketone.

The carbon material in the volatile solvent is brushed over the sandblasted metal surface in a thick coating to produce total coverage of the surface, and the cartridge heated to operating temperature. The volatiles are thus burned off leaving a pink-gray ash which may be smudged with the fingers, but the ash is not readily removed from the cartridge body even when considerable mechanical shock is applied to the cartridge-heater. Dipping is another method for coating, however electrical short circuits could occur between the source body and the solid wire leads coming from the ends of the source; the short circuits can be avoided by carefully scraping the dried lacquer from the vicinity of the wire leads.

The cylindrical, indirectly heated surface of the cartridge-heater permits treatment of the source to produce any desired emissivity pattern through the choice of various coating materials including ceramics. I have found that the ash produced by the lacquer containing the carbon provides an enhanced emissivity that may approach unity in the 10-$\mu$ region.

The use of coatings to enhance the emissivity of the Nernst Glower and Globar is not feasible since these sources would be electrically short-circuited by the application of a black carbonoid lacquer coating in view that the cartridge-heaters by construction are electrically insulated from the heating element.

Figure 4:
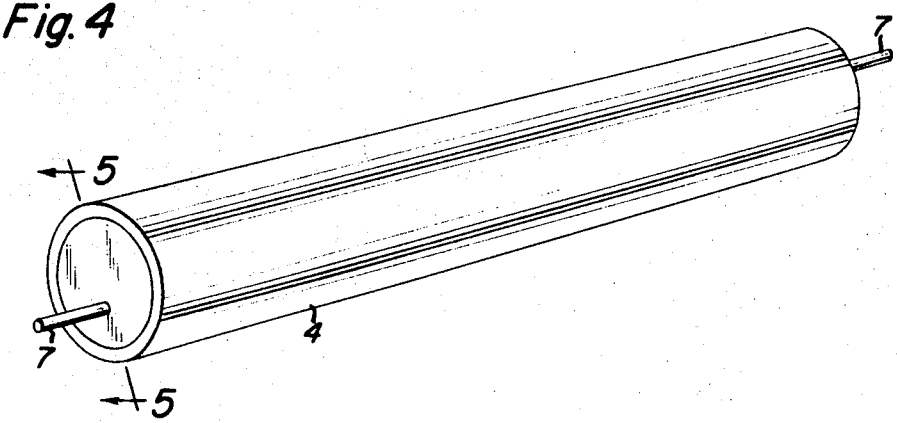
FIG. 4 shows a perspective view of the assembled conventional cartridge-heater.
Figure 5:
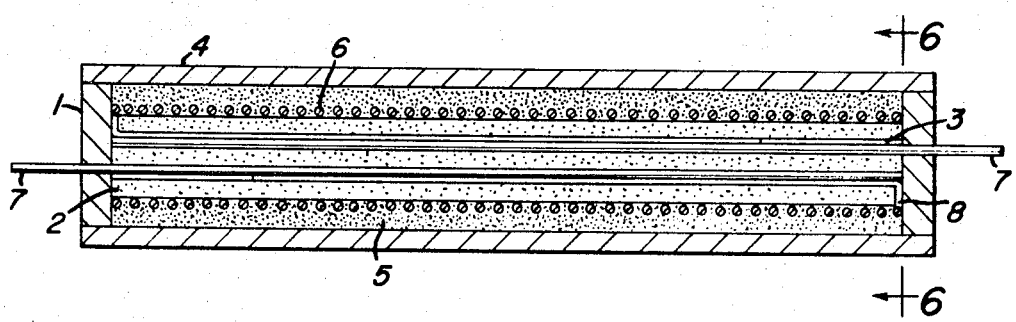
FIG. 5 is a longitudinal cross sectional view taken along the line 5—5 of FIG. 4.
Figure 6:
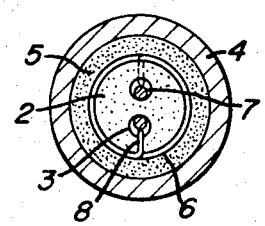
FIG. 6 is a transverse cross sectional view taken along line 6—6 of FIG. 5.
Figure 7:
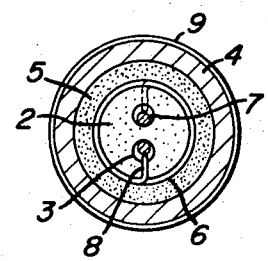
FIG. 7 is similar to FIG. 6 and illustrating the provision of the sandblasted and coating on the surface of the sheath.

In FIGS. 4 through 6, a typical cartridge-heater comprises a resistance wire 6 coiled upon a core 2 with the coiled wire inserted along slot 8. The wire in slot 8 is inserted in opening 3 of core 2 permitting the ends of the wound wire to exit at the ends of the core opening 3 in the form of lead pins 7. The casing or sheath 4 enclosing the insulating material 5 is between the helical coil on the core and the casing which is sealed by a lava plug 1 which is fired hydrus aluminum silicate plug. FIG. 7 is the specific embodiment of my invention showing the sandblasted and coating 9 on the surface of casing. The insulating material is any one having high electrical insulating properties at high temperature and high thermal conductivity such as magnesium oxide. The core is usually made of ceramic material fabricated to close tolerances. The casing is a metal which aids in the distribution of the heat created in the coil evenly throughout the surface of the cartridge-heater. The metal may be those normally used in manufacturing cartridge-heaters such as aluminum, brass, stainless steel, iron base alloys and nickel alloys. Both solid nickel leads usually exit from the single end through a lava end plug; the opposite end is sealed with a welded metal disk. I have found that it is advantageous to modify the heater by having each nickel lead exit from the two separate ends through the lava plugs. Since the cartridge is heated internally through a resistance winding, the "glow area" of the cartridge may be varied by changing the length and diameter of the winding. Voltage and current characteristics may be varied by changing the gauge of resistance wire. The commercially available heaters will operate from 115 or 230 volts A.C. in power ratings from 100 to 2000 watts and physical sizes from 3/8" O.D. x 1" long to 5/8" O.D. x 12" long.

These heaters have been used for many years in applications where high wattage-density electrical heating is required. Although stock heaters are available at ratings down to 55 watts at 115 volts A.C. or D.C., no attempt has been made to determine the practical lower limits of dimension and power requirement for these units, with the special consideration of their use as a source of infrared radiation.

This is not surprising since the commercially available cartridge-heaters, operating at 850° C., have emissivities dropping from about 0.6 at 4 micron wavelengths to about 0.3 or less or longer wavelengths near 12 or 14 microns.

A standard cartridge-heater may be operated at actual free-air temperatures up to 1150° C. for a short-lifetime application, e.g., 10 hours at power dissipation of 24 watts or more or at temperatures near 800° C. for power inputs near 10 watts, with lifetimes in excess of 5000 hours. Normal operating requirements for a true temperature of 1060° C. are 1.07 amperes at 18.7 volts A.C. or D.C. for power consumption of 20 watts continuously varying about this value. The commercially available cartridge-heaters may be designed to operate with virtually any common input voltage consistent with physical size limitations, except that values below 24 volts are a little more difficult to achieve.

The more specific commercial available cartridge-heater is cylindrical, 1 cm. long x 4 mm. diameter, and consists of a resistance wire wound on an insulating core, packed in magnesium oxide within a metal tube or sheath. Each solid lead is approximately 5 cm. long. In operation, the body glows uniformly over its central 7 mm. length with a 1.5 mm. zone at each end—the depth of the lava end caps—operating at 50° C. below the temperature of the control zone. The overall configuration of the cartridge-heater is similar to a ½ watt electronic resistor and, in fact, the unit could be soldered unto a support if so desired.

The untreated cartridge-heater offers distinct advantages over the conventional Globar and Nornst Glower based on the power consumption and configuration. Globar, in the overall power consumption, is greater than the cartridge-heater in its compact configuration. The said heater has a higher voltage and lower current operation thereby permitting a more efficient power supply, either from special power pack or from the A.C. line. Since the said heater is electrically connected through two solid loads emerging through a ceramic insulator at one end of the shell, there is no need for the silver solder techniques used with the Nernst Glower, or for the ohmic clip contacts, frequently intermittant, used with Globars.

Figure 2:
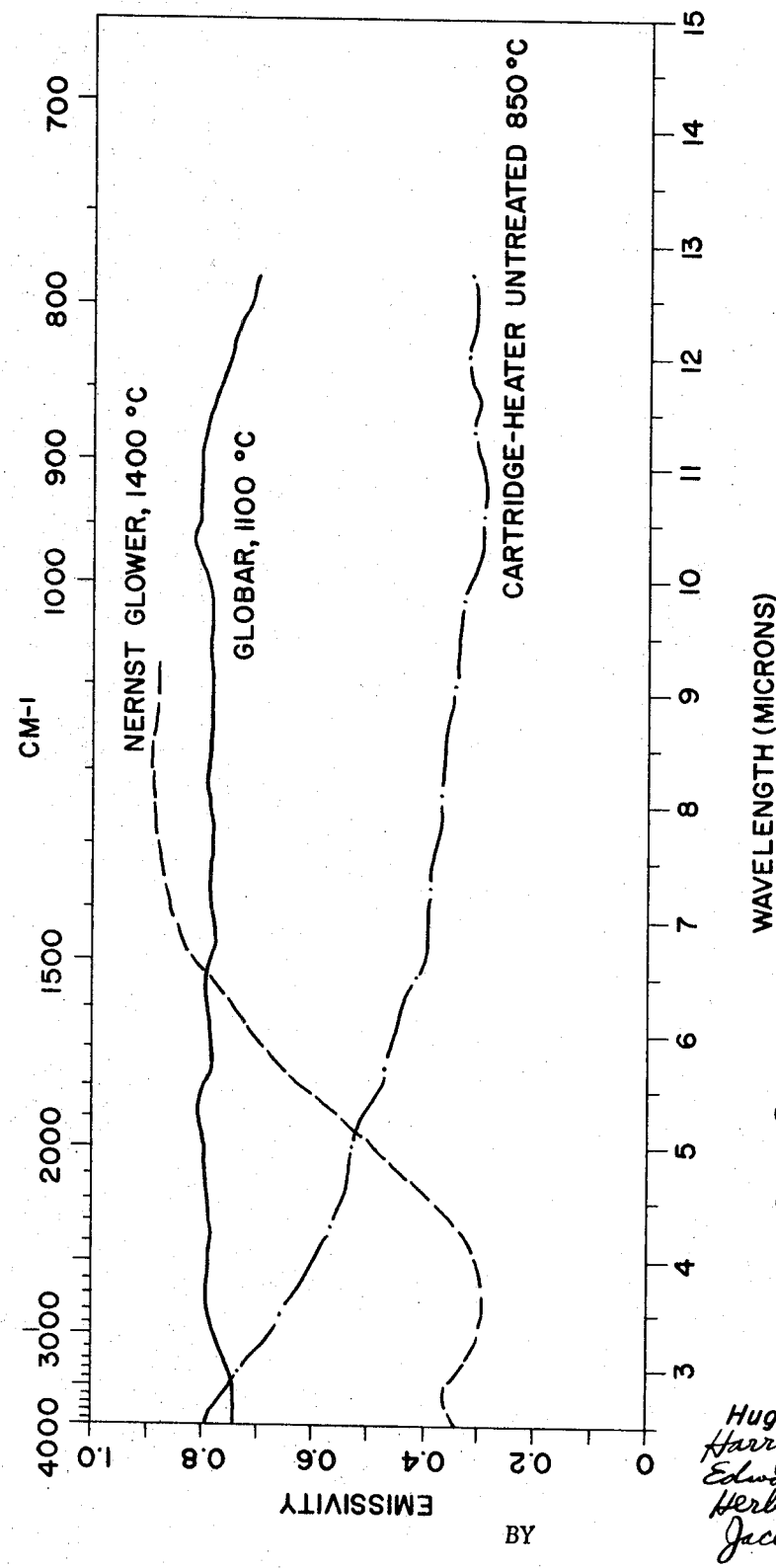

Emissivity measurements of the untreated cartridge-heaters, Nernst Glower and Globar are shown in FIG. 2. Emissivity is the measure of the radiating capability of an object compared to a perfect radiator or "black body." Values range from near zero for a polished surface to unity for a black body. The cartridge-heater temperature measurements were obtained through pyrometric means using a Perkin-Elmer model 99-double-pass monochromotor, suitably instrumented and confirmatory data were obtained from Perkin-Elmer model 137 Infracord and Beckman IR 5-A spectrophotometers. In FIG. 2 it will be noted that the untreated cartridge-heater curve (taken for 850° C.) shows emissivities of about 0.8 in the visible wavelengths, but this value decreases gradually with increasing wavelengths to about 0.3 at $12\mu$. Globar curve (taken for 1100° C.) shows a relatively flat value for emissivities of about 0.8 in the visible wavelength to $12\mu$. The Nernst Glower curve (taken for 1400° C.) shows emissivities about 0.35 at $4\mu$ with a sharp increase to about 0.90 at wavelength $8\mu$, then a relatively flat curve thereafter. It is patent that the emissivity of the untreated cartridge-heater does not approach the emissivities characteristics of either the Globar or Nernst Glower.

Figure 1:
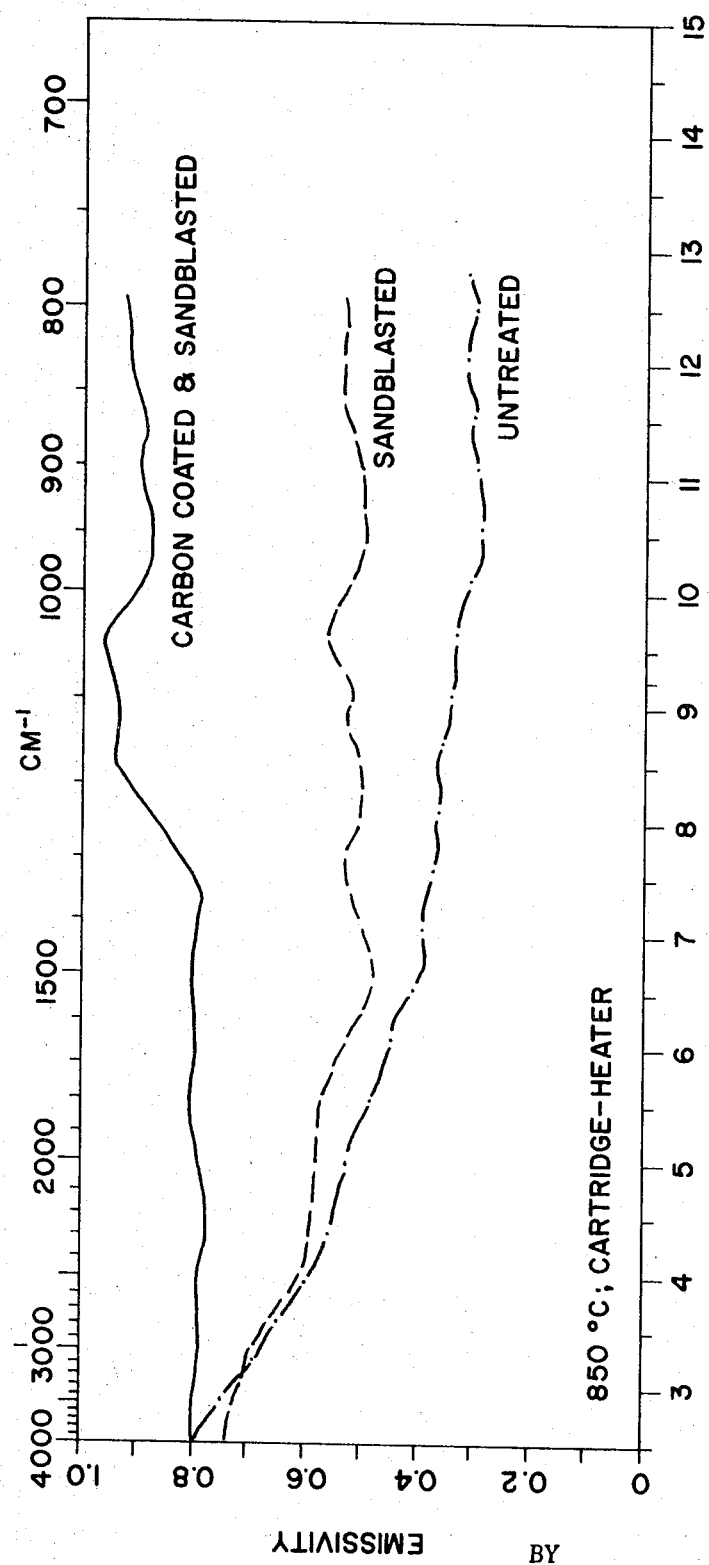

FIG. 1 describes the emissivity and wavelength of the untreated cartridge-heater as compared with the treated that is sandblasted and sandblasted in combination with the carbon black lacquer. The curves clearly show increase in the emissivity of the treated heater. It was unexpected to find flat emissivity curve of about 0.8 in the visible wavelength to about $7.5\mu$ of the combination of carbon coated and sandblasted heater and, in addition, the unobvious increase of emissivity of 0.9 and above at about $8.5\mu$ to $12\mu$ and the approaching unity in the $10\mu$ region. Sandblasting, combined with the oxide layer formed when the cartridge-heater is heated, can raise the emissivity value to about 0.5 at $7.5\mu$ and above. Best results are obtained when the carbon black is applied after sandblasting.

The cartridge-heater which is sandblasted and lacquer coated emissivity approaches that of the Globar and Nernst Glower.

Figure 3:
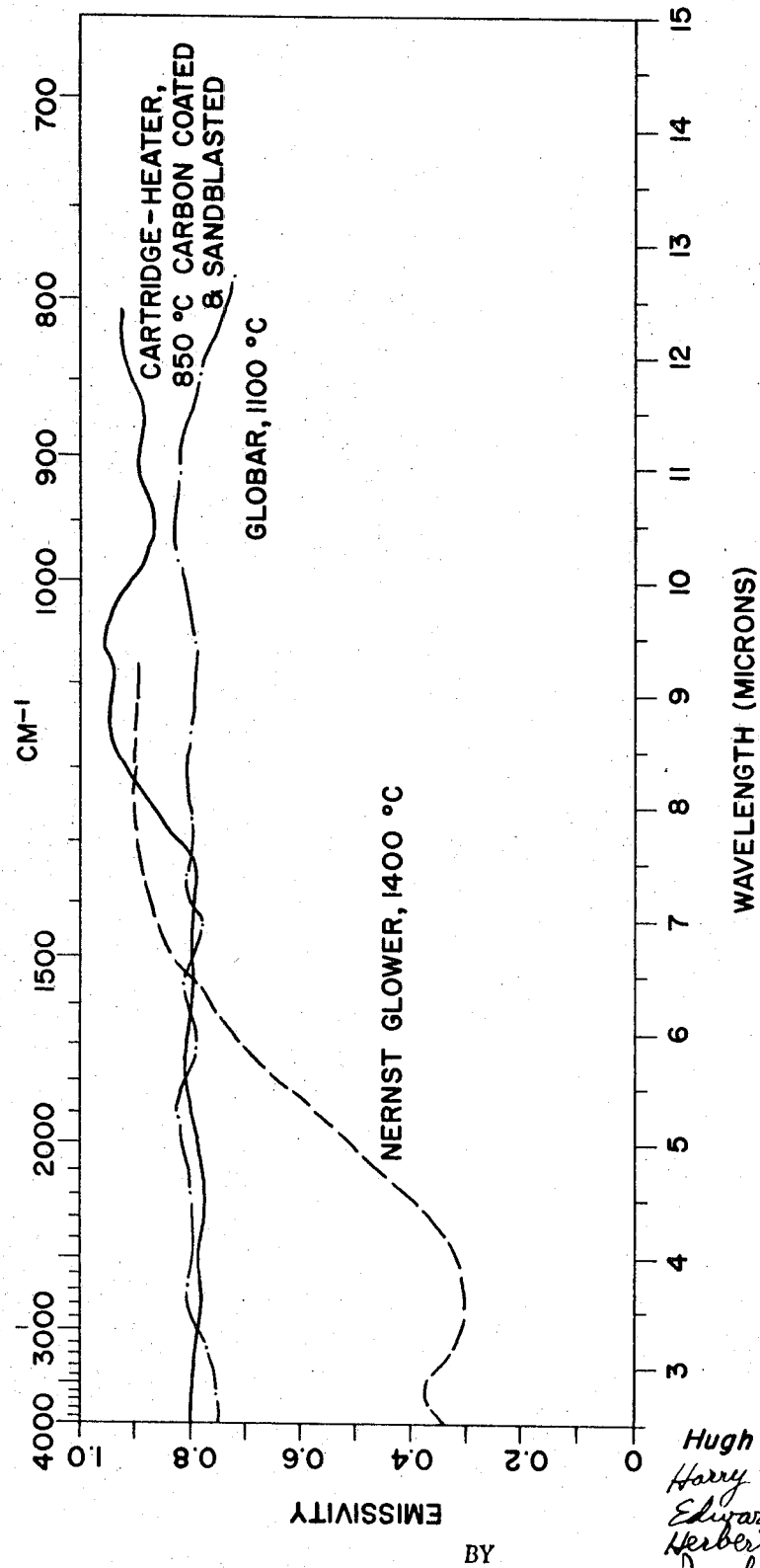

FIG. 3 describes the comparison of emissivity of the cartridge-heater which is carbon-coated and sandblasted and Globar and Nernst Glower. The curve of the cartridge-heater equals or exceeds the emissivity at most wavelengths of Globar and Nernst Glower. Now for the first time there is available a source of infrared radiation utilizing a modified cartridge-heater. These heaters offer some distinct advantages over the Nernst Glower and Globar. More specifically the heater offers advantageous power requirements compared to the Globar, in that overall power consumption is less in this more compact configuration (1 cm. long x 4 mm. diameter). Higher voltage and lower current operation permits more efficient power supply, either from special power packs or from AC line.

The power drain of the cartridge-heater is much less than the standard configurations of the other infrared sources, in addition, the cartridge-heater is an AC–DC unit behaving exactly the same for either voltage source. The Glower cannot be operated on DC for very long without deterioration and, the Globar is susceptible to polarization effects. Starting is not a problem with the cartridge-heater, whereas the Glower must be preheated. Globar requires a longer period of time as compared with the heating time for the cartridge-heater due to the latter's smaller thermal mass.

This method of modifying cartridge-heaters by sandblasting and carbonoid lacquer coating has unlimited application. This is a modern method designed by the inventor to obviate the disadvantages inherent in the standard sources for infrared radiation. One of its assets, in addition to its low power requirement, is that it opens many applications which were not previously possible, such as the direct soldering of the heater onto a printed circuit board.

The nature of this invention has been outlined above, and it will be apparent that certain modifications of the present invention come within the province of those skilled in the art; however, it is intended that all such variations be considered within the scope and spirit of this invention.

I claim:
1. A method of treating a heat generating structure for emitting infrared spectrum comprising: the steps of forcing an abrasive of 20 to 200 mesh through a nozzle at a pressure in the range of 30 to 90 pounds per square inch over a metallic exterior surface, applying a coating composition comprising carbon in a volatile solvent to said textured surface and subsequently removing the solvent forming a carbon coating.
2. Method in accordance with claim 1, wherein the coating composition comprising 20–25% carbon and 80–75% of volatile solvent.
3. Method in accordance with claim 1 wherein the carbon being channel black, furnace black, thermal black, acetylene black or lamp black.
4. Method in accordance with claim 1 wherein the volatile solvent being aromatic, aliphatic acetates, aliphatic alcohols or ketones.

References Cited
UNITED STATES PATENTS
3,037,142  5/1962  Griffoul et al. _____ 117—226

WILLIAM L. JARVIS, Primary Examiner

U.S. Cl. X.R.
117—226; 219—553